UNITED STATES PATENT OFFICE.

ALVIN E. CROCKER, OF NEW YORK, N. Y.

COFFEE MIXTURE.

No. 874,305.　　　　Specification of Letters Patent.　　　Patented Dec. 17, 1907.

Application filed May 7, 1907. Serial No. 372,419.

*To all whom it may concern:*

Be it known that I, ALVIN E. CROCKER, a citizen of the United States, residing in the city of New York, in the county of New York and State of New York, have discovered a new and Improved Coffee Mixture, of which the following is a specification.

My invention is a composition of ingredients forming a very desirable and healthful substitute for ordinary commercial coffee, it being a mixture of asparagus berries, figs, and commercial coffee, each roasted and ground.

The composition consists of ripe asparagus berries, 3 parts roasted and ground Smyrna figs finely chopped, roasted, and ground, 1 part, and commercial coffee roasted and ground, 2 parts.

In using the composition to produce a beverage in which the usual ill effects of commercial coffee will be neutralized, mix the asparagus berries and figs thoroughly, then take one part of such mixture and two parts of commercial coffee, mix them, and put one dessert spoonful of the mixture in a cup of boiling water; boil five minutes, strain through fine cloth, and serve with boiling milk or cream and sugar to taste. The coffee proper in such beverage imparts its usual flavor, but its injurious effects upon digestion and the nervous system are neutralized by the other ingredients so that a delicious as well as healthful beverage is produced which few can distinguish from Mocha.

In roasting the asparagus berries, the heat should not be so high as to burn them, but the product of the process should be crisp like well roasted commercial coffee. The figs should also be treated in the same manner, until they become duly crisp. By care in this operation, the desired color and flavors of the products will be preserved.

What I claim is;

A coffee mixture consisting of ground roasted asparagus berries, finely chopped roasted Smyrna figs, and roasted coffee, substantially in the proportions specified.

ALVIN E. CROCKER.

Witnesses:
　ALBERT G. SHEPARD,
　CLARENCE SWIFT.